United States Patent [19]

Gillberg

[11] 4,093,507
[45] June 6, 1978

[54] METHOD OF LIQUID TREATING CELLULOSE FIBRES WITH ELASTIC PRESSURE SHOCKS

[76] Inventor: Torsten Gillberg, 39 Norralundsgatan, S-602 14 Norrkoping, Sweden

[21] Appl. No.: 742,919

[22] Filed: Nov. 17, 1976

[51] Int. Cl.² .................. D21C 1/02; D21C 1/10; D21C 5/02
[52] U.S. Cl. .................. 162/18; 162/4; 162/21; 162/22; 162/56; 162/57; 162/243; 68/43; 366/156; 366/179; 366/287
[58] Field of Search .................. 162/18, 234, 4, 65, 162/57, 21, 22, 25, 26, 50, 56, 1, 235, 236, 247, 243, 5, 242, 60; 210/350; 259/8; 68/43, 181 R, 51

[56] References Cited

U.S. PATENT DOCUMENTS

| 51,705 | 12/1865 | Dixon | 162/57 |
|---|---|---|---|
| 1,818,039 | 8/1931 | Busch | 162/26 |
| 2,116,511 | 5/1938 | Earle | 162/5 |
| 3,073,737 | 1/1963 | Crosby et al. | 162/18 |
| 3,154,464 | 10/1964 | Doosselaere | 162/26 |
| 3,644,170 | 2/1972 | Mekata et al. | 162/21 |
| 3,932,206 | 1/1976 | Illingworth | 162/4 |

FOREIGN PATENT DOCUMENTS

| 677,418 | 1/1964 | Canada | 162/18 |
|---|---|---|---|
| 147,232 | 9/1921 | United Kingdom | 162/65 |
| 338,389 | 12/1928 | United Kingdom | 162/56 |
| 962,410 | 7/1964 | United Kingdom | 162/18 |

OTHER PUBLICATIONS

Rydholm "Pulping Processes," Interscience Publishers, 1965, New York; pp. 326-330.
Witham, Sr., "Modern Pulp and Paper Making," 1942, New York, p. 358.
Casey, "Pulp and Paper," Interscience Publishers, N.Y., 1960, pp. 990-994.
Matzke, "Repulping of Printed Waste Paper by Flotation of Printing Ink (Deirking)," Escher Wyss News, vol. 44, pp. 70-79, 1971.

*Primary Examiner*—S. Leon Bashore
*Assistant Examiner*—Steve Alvo
*Attorney, Agent, or Firm*—Burns, Doane, Swecker & Mathis

[57] ABSTRACT

Cellulose fibers are treated by providing the fibers in a 10-90% concentration in liquid, and applying elastic pressure shocks to the fibers for a duration not exceeding one second and of a magnitude causing the pressure in the interior of the fibers to exceed 0.2 atmospheres excess pressure. Thereafter the fibers are permitted to expand. The pressure shocks cause liquid to be expelled from the fibers without permanent deformation of the fibers occurring. When the fibers expand, liquid is adsorbed. These steps are repeated until the fibers are completely impregnated with liquid. This prevents the formation of fiber knots when the fibers are substantially dried before being formed into paper. The elastic pressure shocks can be applied by a rotating paddle wheel which intermittently elastically compresses the fibers against an elastic surface of a container.

1 Claim, 6 Drawing Figures

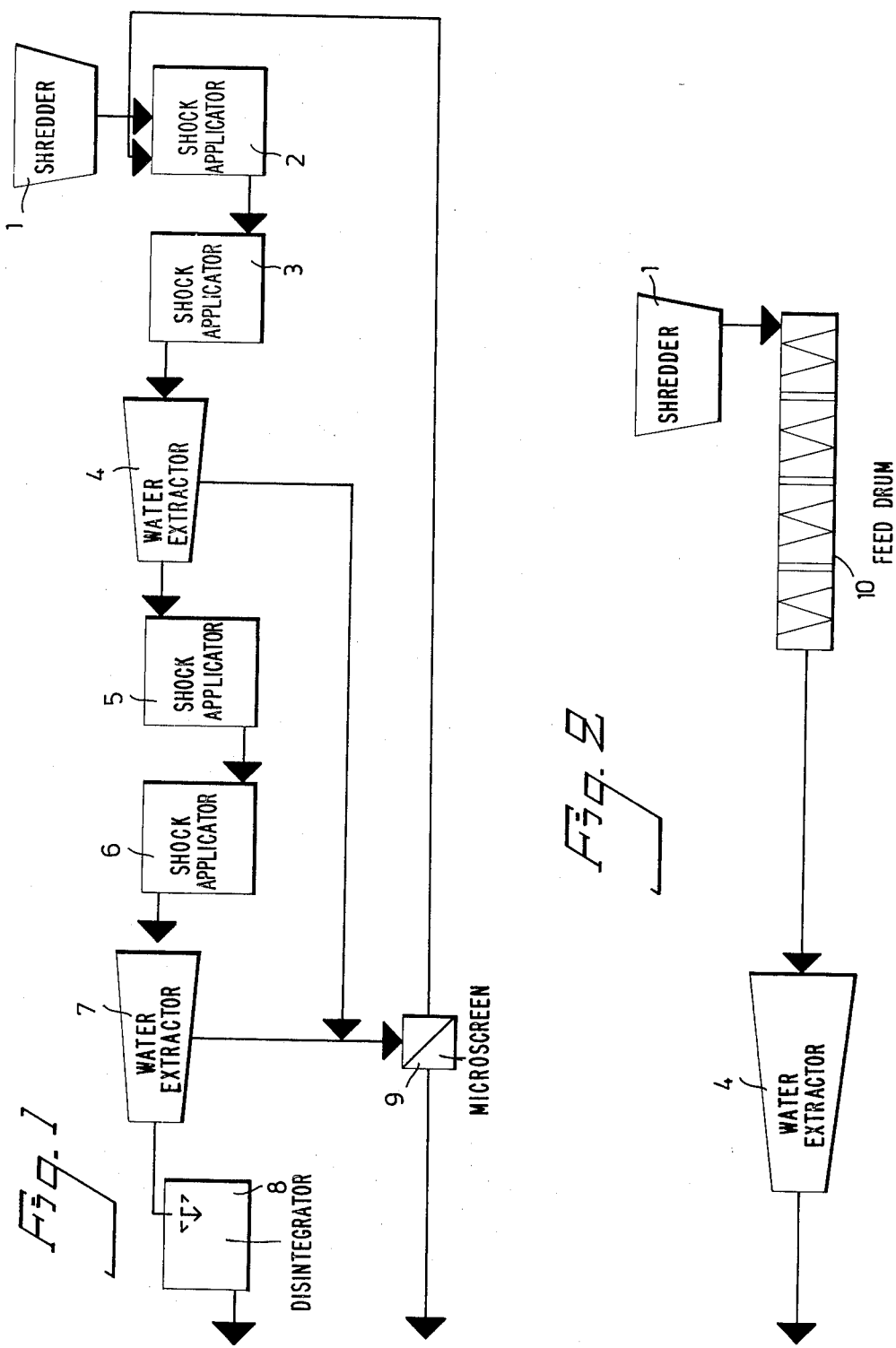

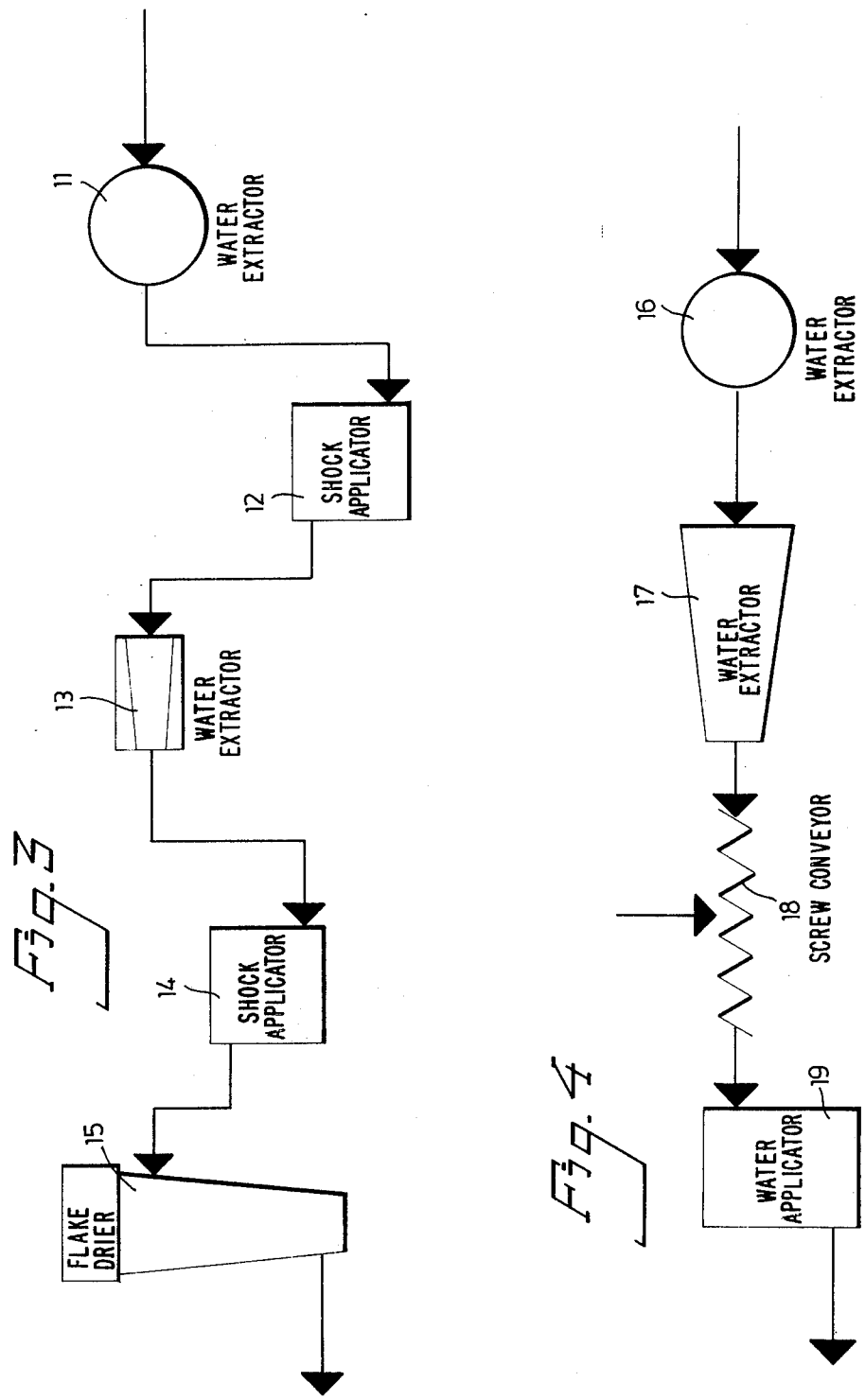

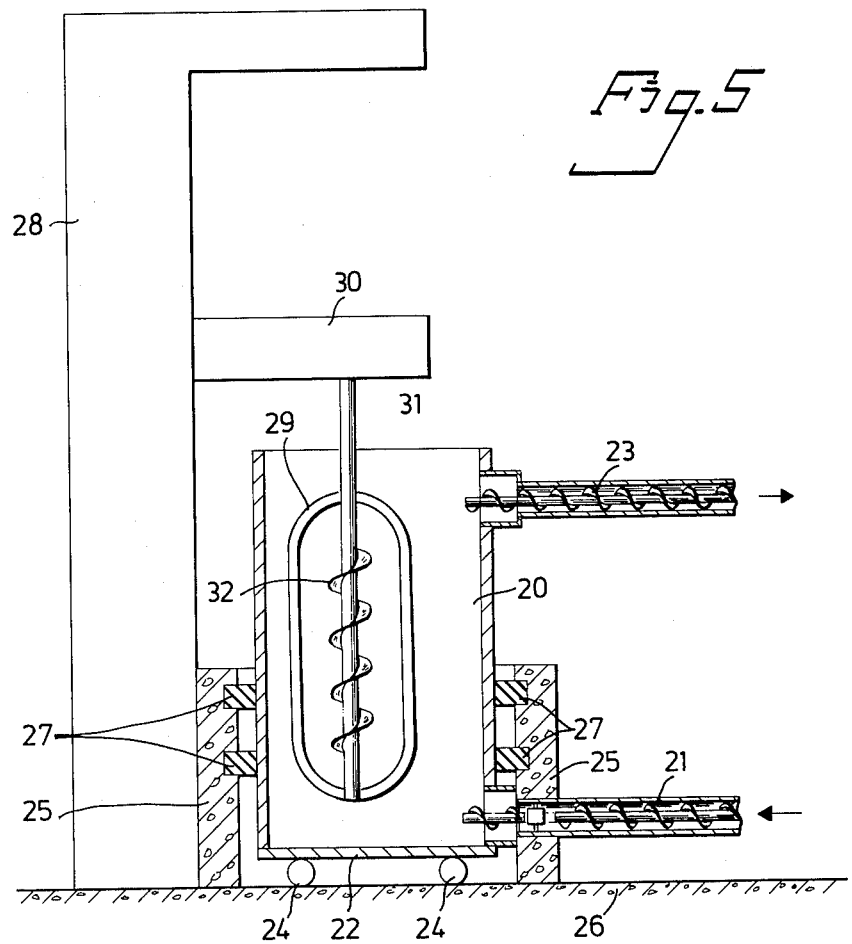
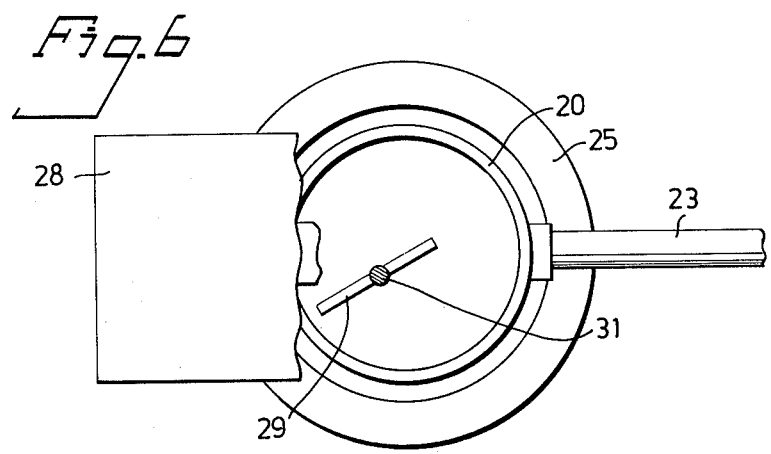

METHOD OF LIQUID TREATING CELLULOSE FIBRES WITH ELASTIC PRESSURE SHOCKS

The invention relates to a method of treating cellulose fibers in a cellulose pulp with a liquid, wherein the pulp is intermittently given elastic compression forces.

In different types of treatment of cellulose pulp, e.g. defibration, paper production, de-inking, bleaching, etherification, esterification etc., it is of extremely great importance that the individual fibres take up a sufficient amount of liquid for them to swell.

The term "cellulose pulp" is here intended to mean chemical, semichemical and mechanical pulp as well as shredded paper waste.

Fiber knots can occur when mechanical, semichemical and chemical pulp is dried and pressure dewatered to pulp concentrations above 15%, and the insolubility of these fibre knots is amplified during the subsequent drying of the cellulose pulp. The pulp will thereby be less suitable for producing paper. This formation of fibre knots is caused to a large extent by the cavities of the cellulose fibres containing air, hindering the entry of water or other liquid into the fibres.

A well-impregnated fibre contains adsorbed water, i.e. water which has been taken up in the cellulose itself, and enclosed water, while a poorly impregnated fibre only contains a smaller amount of enclosed water. It is the adsorbed water which causes the cellulose fibre to swell and it is the enclosed water which is pressed out of the fibres when these are subjected to pressure, in a pressure water extractor, for example. If the fibres only contain a small amount of enclosed water or other liquid, they become strip-like during compression. Such flat fibres form fibre knots in the cellulose pulp, and in passage through the drying cylinders, for example in a papermaking machine, these knots are overdried and become horny.

Knot formation also occurs in pressure water extraction and drying of well-impregnated pulps, which is due to the occurrence of cellulose with low density as is found in certain thin-walled springwood fibres.

When such a fibre is treated with a chemical liquid, the pores are filled with the chemical solution and the solution subsequently pushes out the washing water during washing. When the water in such a fibre is pressed out of the fibre before drying, the fibre is flattened, thus causing knotting on subsequent drying.

One of the objects of the invention is therefore to provide a dispersal of these fibre knots and the bindings occurring between the fibres, by causing all the fibres to reach a completely swollen condition.

Another problem forming the basis of the invention is that in reactions, e.g. de-inking and bleaching of cellulose pulp, etherification and esterification, etc. to provide such liquid supply to the individual fibres and uncovering or separating of them that the reaction chemicals are given a very high efficiency.

It is therefore a further object of the invention to provide separation of the fibres in the pulp and selectively to provide exchange of enclosed liquid.

These objects are realized completely by the invention as defined in the patent claims, and which is essentially based on subjecting the cellulose fibres to pressure shocks of such magnitude and duration that the fibres are alternatingly compressed and expand without remaining deformation until complete impregnation and/or exchange of enclosed liquid has been achieved.

Such pressure shock treatment is not to be confused with known pressure shock treatment of fibre suspensions, e.g. in a rod mill according to the U.S. Pat. No. 2,116,511. In the apparatus described therein, the fibres in the suspension are pressed during long pressure periods against a wall of soft rubber to amplify the rubbing effect between the fibres. However, compression of the fibres is not obtained to any measurable extent, nor is it possible in a suspension to obtain, according to the invention, the necessary interior excess pressure in the fibres during the extremely short pressure shock, the duration of which is preferably only some tenths of a second but which can extend up to about 1 second depending on the type of pulp employed.

From, for example, the Swedish patent 316,362, it is further known to subject a fibre suspension to pressure shocks by reducing the liquid volume for the purpose of increasing rubbing between the individual fibres in the suspension. However, the present effect intended by the invention is not obtained in this case either, namely impregnation and/or exchange of liquid in the interior of the fibres, since a prerequisite for such exchange or such impregnation is a high pulp concentration, i.e. a concentration of the order of magnitude 10–90%, and preferably a concentration exceeding 15%.

The most vital characterizing features according to the invention are thus that the pulp is provided in a concentration or consistency of 10–90%, that the cellulose fibres are subjected to pressure shocks having a duration of less than 1 second and of such a magnitude that the pressure in the interior of the fibres is increased to a value exceeding 0.2 atmospheres excess pressure, that the fibres are allowed to expand between pressure shocks without remaining deformation and that the treatment is maintained until complete impregnation and/or exchange of liquid enclosed in the fibres has been achieved.

Treatment according to the invention allows poorly impregnated fibres, for example, to receive such good impregnation that they can be worked in a beating machine to produce high quality paper. Poorly impregnated fibres become strip-like when they are subjected to high pressure in a worm press or a disc refiner, and they make a rolling movement which causes the flattened fibres to entangle themselves with each other and form fibre knots at concentrations of the order of magnitude of 15%. Even though these fibres are unimpregnated to a large extent, a small amount of hemicellulose is released, which during subsequent drying causes the fibre knots to be united very closely together by the formation of hydrogen bonds. These fibre knots cannot be dispersed with conventional pulp dispersing methods. The invention enables dispersion of such fibre knots by means of the short heavy pressure shocks in combination with a small supply of liquid. The favourable effect according to the invention would appear to be caused by the fibres being flattened during the pressure shock and that during the subsequent expansion they suck in liquid, preferably alkaline, into the cavities in the fibres, the liquid there being bonded to the OH groups of the cellulose. The fibre thus begins to swell and straighten out. Together with the high interior fibre pressure, this effect causes the remaining hydrogen bonds between the fibres to rupture. A knot-free and well-impregnated swollen fibre is obtained, which gives a paper with very high quality in subsequent beating treatment.

The new method which causes the pump effect, indicated above, between fibre and liquid is employed to advantage for de-inking.

The invention will now be described below while referring to the appended drawing.

In the drawing

FIG. 1 shows a flow diagram over a plant selected as an example of the application of the invention, for de-inking printing paper waste, FIG. 2 shows a variation of the plant according to FIG. 1, FIG. 3 shows a flow diagram of a plant for flake-drying of cellulose pulp while applying the invention, FIG. 4 shows a flow diagram of an embodiment of a plant for peroxide bleaching, oxygen gas bleaching or pulp colouring while applying the invention, and FIGS. 5 and 6 show a planetary mixer, arranged to treat cellulose pulp according to the invention.

A plant is schematically illustrated in FIG. 1 for de-inking newspaper pulp waste. The waste is fed from a shredder 1 to an apparatus 2 the water has been added so that a concentration of at least 30% dry content has been obtained. The pulp is defibrated by the fibres being subjected to pressure shocks according to the invention. The treatment takes place with conventional de-inking chemicals and chemicals to keep the liberated ink suspended. The apparatus 2, consisting for example of a planetary mixer according to FIGS. 5 and 6, provides the pressure shock treatment as described in conjunction with FIGS. 5 and 6.

The treated pulp is transferred from the apparatus 2 to an apparatus 3 e.g. a planetary mixer according to FIGS. 5 and 6, or a conventional disintegrator, in which the pulp is diluted to a dry content of about 4%.

The diluted pulp is transferred from apparatus 3 to a screw water extractor 4, which presses out so much of the ink-containing water that the dry content of the pulp rises to about 35%.

The dewatered pulp is transferred to an apparatus 5 of the same kind as apparatus 2, and the pulp is once again treated in the apparatus 5 according to the present invention with de-inking chemicals and suspending agent, whereafter it is transferred to a corresponding apparatus 6 or a disintegrator, in which it is once again diluted with water to about 4% dry content.

The pulp is transferred from the apparatus 6 to a further screw water extractor 7, which presses out so much water that the dry content of the pulp rises to 35%. The pulp, now free of ink, is finally diluted in a disintegrator 8 to about 4% dry content and is taken into paper production.

The water coming from the screw water extractors 4 and 7, blackened by ink, is taken to a microscreen 9 which separates the accompanying cellulose fibres, which are returned to the apparatus 2, for example. The printing ink suspension liberated from fibres is treated, for example, in a flotation plant (not shown), in which the ink is removed together with humus and heavy metals present in the raw water.

The embodiment shown in FIG. 2 distinguishes from the embodiment described above in that the printing paper waste from the shredder 1 is transferred to a drum 10, provided with feed screw and bumping rods, where it is provided with water, de-inking and suspending agents.

From this drum 10 the pulp is transferred to the screw water extractor 4, whereafter the de-inking process continues as in the embodiment of FIG. 1.

In FIG. 3 there is shown a plant for preventing fibre knotting when flake-drying cellulose.

The cellulose pulp with a dry content of about 4% is taken from a storage container to a conventional water extraction apparatus 11, e.g. a rotating vacuum filter, where the dry content is brought up to about 30%. From the apparatus 11 the cellulose pulp is taken to an apparatus 12 for treatment according to the present invention for homogenization, e.g. a planetary mixer according to FIGS. 5 and 6. This homogenization can suitably be accelerated by adding sufficient sodium peroxide so that the pH of the pulp is brought up to about 8.

After this homogenization the pulp is taken to a conventional screw water extractor 13, in which its dry content is increased to about 45%, whereafter it is taken to a still further apparatus 14 according to the present invention, wherein it is worked to disperse the knots formed in the screw water extractor. It has been found advantageous to add a small amount of sodium peroxide here as well.

From the apparatus 14 the pulp is taken to a conventional flake drier 15. It has been found that the thus-treated pulp is practically free of fibre knots after drying, whereas the pulp supplied to the same flake drier 15 from the storage container directly via the water extracting apparatuses 11 and 13 had so many fibre knots that it was practically unusable for manufacturing paper.

FIG. 4 illustrates a plant for peroxide bleaching, oxygen gas bleaching, paper pulp colouring and printing paper decolouring.

Pulp with a dry content of about 4% from a pulp container (not shown) is fed to a conventional water extraction apparatus 16, e.g. a rotating vacuum filter, where its dry content is increased to 15-20%. The pulp is taken from the apparatus 16 to a conventional screw water extractor 17, where its dry content is increased to about 35%. From the water extractor 17 the pulp is taken, suitably by a screw conveyor 18, wherein it is suitably provided with colouring matter, de-inking chemicals or bleaching reagents, to an apparatus 19 according to the present invention (see FIGS. 5 and 6). After treatment in the apparatus 19, the now ready-treated pulp is taken to a papermaking machine (not shown), possibly via a pulp container.

An embodiment of an apparatus for providing the necessary pressure shock treatment of the cellulose fibres is illustrated in a simplified form in FIGS. 5 and 6.

A container 20, preferably comprising a standing cylinder with a flot bottom 22, is provided with a connection for a feed screw 21, close to its bottom 22, and a connection for a discharge screw 23, close to its top. The container 20 is provided with at least three pivotally mounted supporting wheels 24, and is positioned inside a cylindrical wall 25 having a greater inside diameter than the outside diameter of the container 20. The wall 25 is rigidly connected with a substructure, e.g. a floor 26, and is made from a rigid and very stable material, e.g. reinforced concrete. On its inside, it is provided with buffers 27, made from elastic material, e.g. rubber, which are made as rings accommodated in recesses in the wall 25. The buffers 27 are arranged to keep the container 20 centrally within the wall 25.

A structure 28, placed adjacent the wall 25, is provided with means for raising ahd lowering a planetary mixer paddle 29 with its driving arrangement 30, said paddle 29 being arranged to strike the inner wall of the container 20 during its planetary movement so that the container during this action, counteracted by the buffers 27, is given a rotating oscillation.

Every time a paddle edge strikes or at least comes very close to the inner wall of the container 20, a part of the pulp, and thereby the cellulose fibres, is compressed between the wall and the paddle edge, and as soon as the pressure shock generated thereby ceases, the fibres will elastically return to an expanded condition whereat liquid is partly adsorbed and partly enclosed in unswollen fibres. The take-up of liquid presumably takes place through deformation during compression by the pressure shock and by suction during expansion, but which factor is the deciding one is difficult to say.

During the pressure shock, heat, inter alia, is formed, which contributes to rupturing the hydrogen bonds between the fibres and thereby achieving defibration and dispersion of fibre knots. A contributing cause of defibration and dispersion of the fibre knots is also the shearing forces acting between the cellulose fibres during the pressure shock. As the fibres are subjected to the pressure shocks, swelling is completed and the enclosed liquid is "pumped" out of the cavities and is replaced by new liquid, which causes the good effect in de-inking, bleaching, colouring etc.

It has also been found advantageous to provide the shaft 31 carrying the paddle 29 with means for imparting to the pulp in the container a vertical circulatory movement, said means being for example formed as a vertical screw 32 or as propellers mounted on the shaft 31.

The apparatus described above for providing pressure shocks can be replaced with other suitable apparatus, e.g. rollers with a mutual reciprocatory movement through which the pulp is taken. The pressure shocks can also be achieved by enclosing the pulp in a container wherein the pressure can be varied. A number of trials which have been carried out with pressure shock treatment of cellulose pulp in comparison with conventional treatment are accounted for in the following.

TRIAL 1

A flake-dried semichemical beech paper pulp in the form of bales was provided with water to 4% pulp concentration and beaten in a hollander beater. The fibre suspension obtained gave a very poor quality paper due to the abundant presence of fibre knots and poor liquid impregnation of the fibres. The paper strength was also of poor standard. The beech cellulose fibres contain a high percentage of cellulose with low density. When drying of this cellulose pulp is preceded by a heavy dewatering pressure, for example in a screw water extractor, these fibres are flattened and form fibre knots which are extremely difficult to disperse.

For some reason unknown up to now, the flattened fibres appear not to be able to adsorb water and only contain very insignificant amounts of enclosed water, which is the main reason for a paper, manufactured from cellulose with a high content of such fibres, being so sub-standard.

On the other hand, a well-impregnated fibre containing both adsorbed and enclosed water gives an impeccable paper.

TRIAL 2

The same paper pulp as in Trial 1 was provided with water to 6% pulp concentration and was beaten and defibrated in an ordinary beater. As was expected, the suspension obtained gave a paper very rich in knots with the same poor strength qualities as in Trial 1.

TRIAL 3

The same paper pulp as in Trials 1 and 2 was subjected to combined pressure shock and mixing treatment according to the invention during simultaneous liquid feed up to about 30% pulp concentration. After dilution the paper pulp obtained gave a first-class knot-free paper with good strength qualities.

When the cellulose fibre is thrashed against the yielding container wall so much heat energy is generated locally and under a short moment that the hydrogen bonds keeping the fibres and fibre knots together are ruptured.

After the cellulose fibre has been repeatedly subjected to such yielding and shearing pressure shocks, this hydrogen bonding has been completely eliminated. As soon as contact is released between the mixing and defibrating means, the cellulose fibre and the yielding container wall, the fibre begins to straighten itself out both with regard to length and width. There occurs hereby a suction action inside the fibre: Supplied liquid is then sucked into the cavities of the fibres where it is chemically bound to the OH groups of the cellulose.

The liquid thus adsorbed in the cellulose can naturally not be repressed out of the fibre at the next contact between the container wall, fibre and contact means. On the other hand, however, at every such contct the liquid enclosed in the fibre will be pressed out, whereafter new liquid is sucked in so that from the interior it can react with, and swell the cellulose of the fibre. Through this swelling together with the homogenization of the cellulose with low density which takes place in conjunction with the shearing pressure of the mixing means against the container wall, the cellulose fibre can be given the strength characteristics desired for the paper formation during after-treatment in the beating means.

TRIAL 4

A flake-dried, unbleached sulphite pulp in compressed baled form was provided with water to 4% pulp concentration and beaten in a hollander. The fibre suspension obtained gave a very poor paper with low strength characteristics due to the abundant presence of fibre knots and unsatisfactory liquid impregnation of the fibres.

TRIALS 5-6

The same paper pulp as in Trial 4 was treated in the same way as the semichemical pulp according to Trials 2-3, these trials with the unbleached sulphite pulp giving corresponding final results as the Trials 2-3 gave with the semichemical pulp.

TRIAL 7

Certain qualities of certain paper colourings were added to a bleached sulphite pulp with a 4% pulp concentration, and the colourings were mixed with the pulp in a laboratory pulper, whereafter the pulp solution was diluted to about 0.5% pulp concentration for the formation of sheets. The water departing on sheet formation was heavily coloured.

TRIAL 8

The same sulphite pulp as Trial 7 at about 30% pulp concentration was provided with the same amount of the same paper colourings as in Trial 7 and was mixed in an apparatus according the FIGS. 5-6. Thereafter the pulp was diluted to about 0.5% pulp concentration for the formation of sheets. The water departing on sheet formation was extremely slightly coloured.

The reason for this is that in pulp concentrations over 30% there is practically no liquid surrounding the fibres, it being instead absorbed in the cellulose and enclosed in the cavities in the cellulose fibre. If paper colourings are added to such a cellulose pulp while it is treated according to the invention, the colour will be partly "pumped" into the fibres and partly dispersed in the swollen cellulose, whereby the amount of colour in the water departing from sheet formation will be very small. Trials show that pulp concentrations up to 90% can be used.

TRIAL 9

Mechanical wood pulp was provided with water in a mixing hollander to a pulp concentration of about 4%, whereafter it was provided with 3% peroxide solution in the necessary amount for bleaching. The pulp was ready-bleached after six hours, and had a whiteness of 70% G.E.

TRIAL 10

The same mechanical pulp as in Trial 9 was provided with water in a hydrapulper to 10-12% pulp concentration, whereafter it was supplied with the same amount of 3% peroxide solution as in Trial 9. After 3 hours the pulp was ready-bleached and had a whiteness of about 70% G.E.

TRIAL 11

The same mechanical pulp as in Trials 9 and 10 was provided with water in a structure according to the invention and to a pulp concentration of between 30-35%, whereafter it was supplied with the same amount of 3% peroxide solution. After 45 minutes the pulp was ready-bleached to a whiteness of 72% G.E.

Through the treatment according to the invention the peroxide solution is quickly pumped into the cavities of the fibres, which together with the high concentration on reduced water content is the reason for a somewhat higher whiteness being obtained in Trial 11 than in the Trials 9 and 10, and to the increased bleaching speed.

The higher pulp concentration, which can reach 90%, also results in smaller apparatus volume, whereby plant costs will be smaller.

TRIAL 12

A sulphite pulp was provided with water to a pulp concentration of between 30 and 35%, whereafter during treatment according to the invention it was simultaneously treated with chlorine gas. After about 5 minutes the chlorine bleaching was completed. In the conventional methods, chlorine bleaching is carried out at a pulp concentration of about 4%. It then takes between 60 and 90 minutes before bleaching is terminated.

It has been found that chlorine is very quickly incorporated by substitution in the lignin. At a pH of 2-3 and a pulp concentration of about 4%, which is most usual in practical operation, the substitution reaction is completed after between 60 and 90 minutes and terminates thereafter completely independently of how great the chlorine excess is and whether there is lignin left to chlorinate.

At a lower pH the chlorine substitution can be terminated after 5-10 minutes. It has however been found that it is not possible to increase the reaction speed by adding more chlorine to the pulp suspension than what has been determined by laboratory experiments for the respective pulp qualities, as an addition of chlorine above the amount determined in the laboratory does not react with the lignin, which will remain in the pulp after the chlorine treatment.

An increased rection time must thus be achieved in some other way, preferably by reducing the amount of water in the cellulose so that the pulp concentration is increased above 30%, which to advantage can be carried out according to the invention.

During recent years, a new method has been worked out which enables recovery of bleaching liquors, namely the oxygen gas bleaching method. In this bleaching method it is necessary to work with pulp concentrations above 30% to prevent a heavy reduction of the strength qualities of the cellulose. This is facilitated by simultaneously defibrating and alkali treating the cellulose with pressure shocks according to the invention before oxygen gas bleaching. Other suitable bleaching agents are, for example, chlorine dioxide, hypochlorite or hydrosulphite.

TRIAL 13

Printing paper waste in an undefibrated form was treated in a mixing drum with an aquous solution of de-inking chemicals, wherein the major part of the printing ink was dissolved, and was together with the liquid removed from the paper waste in a subsequent screw water extractor.

Thereafter the printing paper waste was defibrated according to the invention while simultaneously adding the de-inking chemicals plus a dirt absorbing agent. After dilution with subsequent screw water extraction the pulp from the printing paper waste has regained the whiteness of 62% G.E. of the original pulps (unbleached sulphite and mechanical pulp). In a subsequent peroxide bleaching according to the invention whiteness of between 70 and 74% G.E. were obtained. Just de-inking of the printing paper waste according to conventional methods gives a whiteness of between 53 and 56% G.E.

With a subsequent peroxide bleaching a whiteness of 57-60% G.E. is obtained. Thus, with these conventional methods the whiteness of the original pulps is not obtained. The reason is that the liberated printing ink pushes into the cavities in the fibres, from which it is not possible to remove it other than by the fibre pumping technique according to the invention. In the conventional de-inking methods, printing paper waste is defibrated in a hydrapulper at a pulp concentration of about 10% while simultaneously adding de-inking chemicals and preferable an agent for lowering surface tension. Thereafter the precipitated printing ink is removed from the pulp suspension by a flotation process. To do this, dilution to a pulp concentration of about 0.1% is carried out, said concentration rising to a few percent in the subsequent filter washing of the de-inked pulp. Large amounts of water are thus employed to remove the dissolved ink from the paper fibres. It has therefore not been economically possible to remove ink from the effluent in flotation and washing filter plants, and these pollutants have therefore been allowed to accompany the effluent into the recipient water.

As a result of the high pulp concentrations at which the de-inking plant according to the invention works, i.e. up to a concentration of 90%, it becomes possible to remove nearly all the printing ink from the de-inking plant effluent, whereby it becomes possible and economically advantageous to reflux the major part of this water to the de-inking process.

The reuse also results in unused chemicals being returned to the process, whereby costs are further reduced.

By this reuse of the effluent there will be a considerable reduction of the amount of fresh water supplied and at the same time a considerable reduction in the cost of purifying it from humus and heavy metals.

From the above trials it is apparent that the pressure treatment according to the invention results in a substantial improvement of the conventional methods.

I claim:

1. In a method of treating cellulose fibers in a cellulose pulp wherein the pulp consistency is in the range of 10-90%, and wherein intermittent elastic compression forces are applied to the fibers, the improvement wherein the applying of elastic forces comprises the steps of:

positioning a rotatable paddle wheel eccentrically within a container so that paddle arms of the paddle wheel at least closely approach an interior wall portion of said container intermittently, providing said wall portion with an elastic surface, introducing the fibers into the container, rotating the paddle wheel to intermittently elastically compress the fibers against said elastic surface to apply elastic pressure shocks to the fibers for a duration not exceeding one second and of a magnitude causing pressure in the interior of the fibers to exceed 0.2 atmospheres excess pressure, whereby liquid is expelled from the fibers and the fibers are not permanently deformed, allowing the fibers to expand following the pressure shocks to adsorb liquid, and repeating said steps of applying shocks and allowing the fibers to expand, until the fibers are completely impregnated with liquid.

* * * * *